United States Patent
Warstler

(10) Patent No.: US 11,314,486 B2
(45) Date of Patent: Apr. 26, 2022

(54) METHODS, SYSTEMS, APPARATUSES, AND DEVICES OF FACILITATING CREATING A COMPUTER APPLICATION BASED ON A NATURAL LANGUAGE

(71) Applicant: Morgan Warstler, Austin, TX (US)

(72) Inventor: Morgan Warstler, Austin, TX (US)

(*) Notice: Subject to any disclaimer, the term of this patent is extended or adjusted under 35 U.S.C. 154(b) by 0 days.

(21) Appl. No.: 17/166,330

(22) Filed: Feb. 3, 2021

(65) Prior Publication Data

US 2021/0165638 A1    Jun. 3, 2021

Related U.S. Application Data

(63) Continuation-in-part of application No. 16/372,926, filed on Apr. 2, 2019, now abandoned.

(60) Provisional application No. 62/651,579, filed on Apr. 2, 2018.

(51) Int. Cl.
    *G06F 8/33*     (2018.01)
    *G06F 40/242*   (2020.01)
    *G06F 3/16*     (2006.01)

(52) U.S. Cl.
    CPC ............... *G06F 8/33* (2013.01); *G06F 3/167* (2013.01); *G06F 40/242* (2020.01)

(58) Field of Classification Search
    None
    See application file for complete search history.

(56) References Cited

U.S. PATENT DOCUMENTS

| | | | |
|---|---|---|---|
| 5,157,618 A * | 10/1992 | Ravindra | H03K 19/1735 716/119 |
| 10,255,001 B2 | 4/2019 | Warstler | |
| 10,698,639 B2 | 6/2020 | Warstler | |
| 10,706,227 B2 | 7/2020 | Warstler | |
| 2005/0257190 A1* | 11/2005 | Shaburov | G06F 8/38 717/121 |
| 2006/0075382 A1* | 4/2006 | Shaburov | G06F 8/34 717/106 |
| 2010/0131923 A1* | 5/2010 | Oon | G16H 10/60 707/769 |
| 2013/0073672 A1* | 3/2013 | Ayed | G06F 8/61 709/217 |

(Continued)

OTHER PUBLICATIONS

Abbott, Ryan, "I Think, Therefore I Invent: Creative Computers and the Future of Patent Law", 57 B. C. L. Rev. 1079. (Year: 2016).*

(Continued)

*Primary Examiner* — Ryan D. Coyer

(57) ABSTRACT

Disclosed herein is a method of facilitating creating a computer application based on a natural language. Accordingly, the method may include receiving, using a communication device, a request from a builder device. Further, the method may include transmitting, using the communication device, a user interface on the builder device. Further, the method may include receiving, using the communication device, the workflow from the builder device. Further, the method may include analyzing, using a processing device, the workflow. Further, the method may include generating, using the processing device, an application file based on the analyzing. Further, the method may include deploying, using the processing device, the application file on at least one end-user device.

20 Claims, 12 Drawing Sheets

(56) References Cited

U.S. PATENT DOCUMENTS

| | | | | |
|---|---|---|---|---|
| 2014/0068545 A1* | 3/2014 | Lehmann | ............. | G06Q 10/103 717/101 |
| 2014/0223413 A1* | 8/2014 | Ge | ............................ | G06F 8/34 717/109 |
| 2015/0363175 A1* | 12/2015 | Klausner | ................... | G06F 8/34 717/109 |
| 2015/0364132 A1* | 12/2015 | Goussard | ............. | G06F 40/174 704/257 |

OTHER PUBLICATIONS

"Works Not Protected by Copyright," U.S. Copyright Office, https://www.copyright.gov/circs/circ33.pdf, retrieved Feb. 25, 2022. (Year: 2022).*

* cited by examiner

METHODS, SYSTEMS, APPARATUSES, AND DEVICES OF FACILITATING CREATING A COMPUTER APPLICATION BASED ON A NATURAL LANGUAGE

CROSS-REFERENCE TO RELATED APPLICATIONS

The present application is related to U.S. Pat. No. 10,255,001 issued on Apr. 9, 2019 (also known as application Ser. No. 15/615,443 filed on Jun. 6, 2017) titled "METHOD AND SYSTEM OF PROVISIONING ELECTRONIC FORMS" by Morgan Warstler et al. The present application is related to U.S. Pat. No. 10,706,227 issued on Jul. 7, 2020 (also known as application Ser. No. 16/289,196 filed on Feb. 28, 2019) titled "METHOD AND SYSTEM OF PROVISIONING ELECTRONIC FORMS" by Morgan Warstler et al. The present application is also related to U.S. Pat. No. 10,698,639 issued on Jun. 30, 2020 (also known as application Ser. No. 16/289,286 filed on Feb. 28, 2019) titled "METHOD AND SYSTEM OF PROVISIONING ELECTRONIC FORMS" by Morgan Warstler et al. All of these patents are incorporated by reference for all that is disclosed and taught therein.

FIELD OF THE INVENTION

Generally, the present disclosure relates to the field of data processing. More specifically, the present disclosure relates to methods, systems, apparatuses, and devices for facilitating creating a computer application based on a natural language.

BACKGROUND OF THE INVENTION

Imagine crowdsourced software that doesn't need to be open source because the crowdsourced software is already in the public domain by definition. The state of the art in application writing enables the developer/programmer to code/put together elements as the developer see fit (whether in computer code or by combining building blocks of on-screen icons) to create special unique applications whose user design is set, for each end-user, by the end-user himself or herself. The problem that arises is that it creates a learning curve for each new application created, both for the application writer who must code the application and for the end-user who must orientate himself or herself to how each application works, requests data and presents itself visually. The inefficiency of the process is akin to a typewriter industry of the early 20th Century lacking a QWERTY standard and each typewriter model sold having the keys arranged in its own unique, innovative, special way. In Bilski, the Supreme Court Rules that "In order to receive patent protection, any claimed invention must be novel, § 102, nonobvious, § 103, and fully and particularly described § 112". Bilski v. Kappos, 561 U.S. Pat. No. 593,602 (2010). Therefore, an application created with a builder software system (e.g. the present invention) that uses plain language coding, with a finite data dictionary, and a structured format of master key pair data and order cannot be patented as software because it can be neither novel nor non-obvious.

Therefore, there is a need for improved methods, systems, apparatuses, and devices for facilitating creating a computer application based on a natural language that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating creating a computer application based on a natural language, in accordance with some embodiments. Accordingly, the method may include receiving, using a communication device, a request from a builder device. Further, the method may include transmitting, using the communication device, a user interface on the builder device. Further, the user interface may include a limited dictionary may include a plurality of keys. Further, the user interface allows at least one builder to arrange selected keys from the plurality of keys in a sequence to generate a workflow. Further, each key of the plurality of keys corresponds to a specific function. Further, the limited dictionary circumscribes a scope of the computer application that may be created using the method, thereby the computer application created using the method may be neither novel nor non-obvious and therefore the computer application may be unpatentable and uncopyrightable. Further, the method may include receiving, using the communication device, the workflow from the builder device. Further, the method may include analyzing, using a processing device, the workflow. Further, the method may include generating, using the processing device, an application file based on the analyzing. Further, the method may include deploying, using the processing device, the application file on at least one end-user device.

Further disclosed herein is a system of facilitating creating a computer application based on a natural language, in accordance with some embodiments. Accordingly, the system may include a communication device configured for receiving a request from a builder device. Further, the communication device may be configured for transmitting a user interface on the builder device. Further, the user interface may include a limited dictionary may include a plurality of keys. Further, the user interface allows at least one builder to arrange selected keys from the plurality of keys in a sequence to generate a workflow. Further, each key of the plurality of keys corresponds to a specific function. Further, the limited dictionary circumscribes a scope of the computer application that may be created using the method, thereby the computer application created using the method may be neither novel nor non-obvious and therefore the computer application may be unpatentable and uncopyrightable. Further, the communication device may be configured for receiving the workflow from the builder device. Further, the system may include a processing device communicatively coupled with the communication device. Further, the processing device may be configured for analyzing the workflow. Further, the processing device may be configured for generating an application file based on the analyzing. Further, the processing device may be configured for deploying the application file on at least one end-user device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
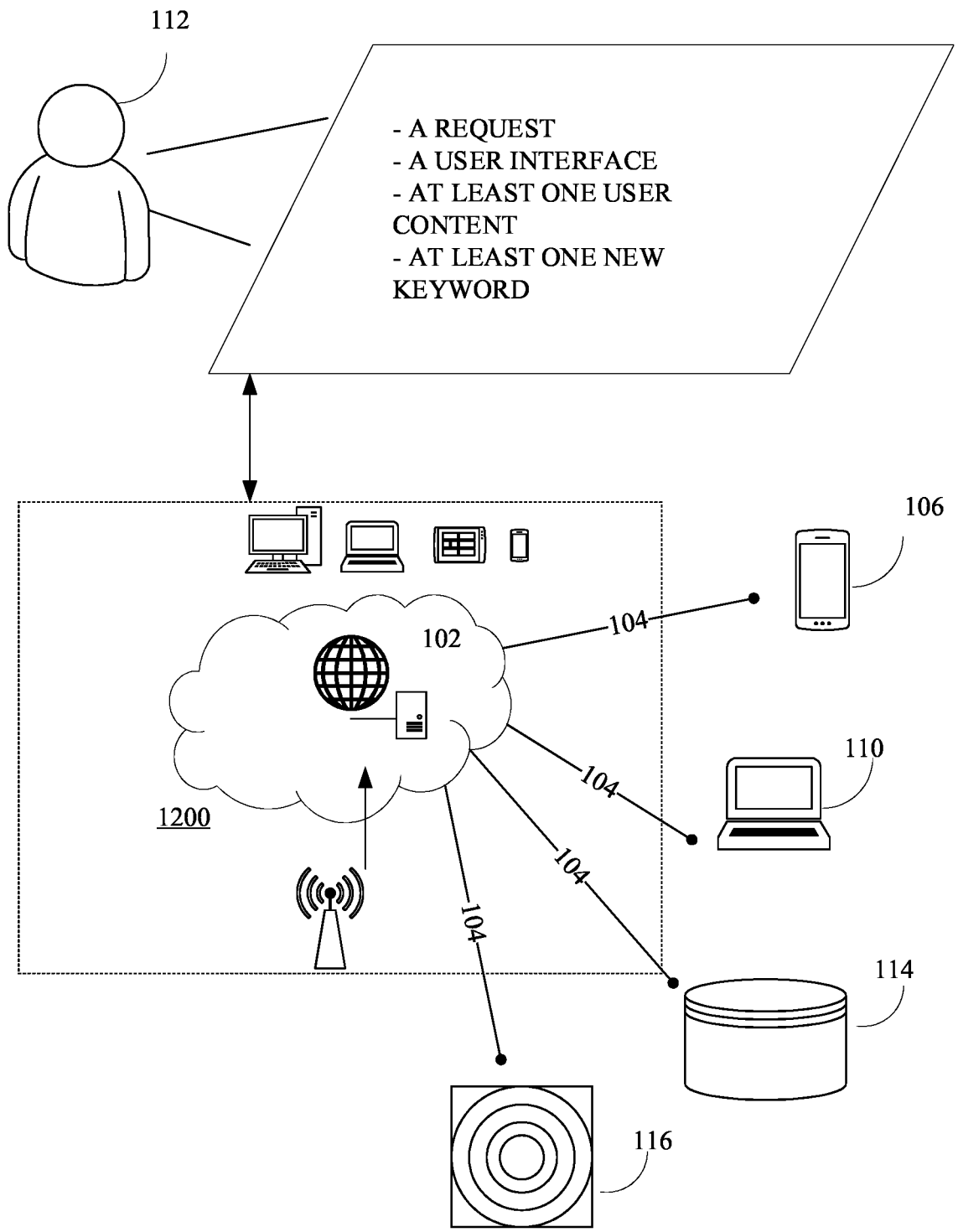
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices of facilitating creating a computer application based on a natural language, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices of facilitating creating a computer application based on a natural language.

The disclosed method may be designed to make software patents obsolete because software written with the process will fall outside the ambit of any statutory patent right/ copyright. Further, anyone (whether a learned programmer or layman) when they design applications based on finite MK dictionary a specific workflow requirement, may build the same application using the disclosed system.

As is well known, there has been a slew of patent applications where someone outlined an existing "real world" business method and described the existing inventions as that plus "do it on a computer", the courts have found these filings to be unpatentable. (see Bilski, 602). In contrast, the disclosed method may include a business process to write computer applications that necessarily may only be done by use of a computer, as such it is patentable ("State Street dealt with whether a piece of software could be patented and addressed only claims directed at machines, not processes. His opinion may, therefore, be better understood merely as holding that an otherwise patentable process is not unpatentable simply because it is directed toward the conduct of doing business", Ibid., concurrence, FN40.). Further, by allowing the user to set the user interface that is identical for all applications designed by use of the disclosed system, it provides "a specific solution to then-existing technological problems in computers and prior art [computer applications]". Data Engine Technologies LLC v. Google LLC, No. 2017-1135 (Fed. Cir. 2018). This solution provides a "specific, structured graphical user interface paired with a prescribed functionality directly related to the graphical user interface's structure that is addressed to and resolves a specifically identified problem in the prior state of the art." Id.

Further, the disclosed system may be configured for writing computer applications in a standard format that requires no technical software coding skill & uses the designer's native language to describe their desired workflow, which allows each end user to set his or her user interface design that would be identical with each application they use that is built with the present invention. The present invention uses a plain computer language Global Vocabulary Markup Language ("gvml") with a data dictionary to create electronic cards that each contain data in a master key format (supporting key values pairs). Each word in the data dictionary equals a particular master key and each master key equals a particular word in the data dictionary (with equivalent data dictionary terms for human languages other than English). Regardless of how many cards are combined to create an application, any particular workflow can only be created in one particular way. As a consequence, since an application that requests user data is analogous to blank business forms that request user data, any such application built with this invention would not itself be copyrightable. What's more, the combination of standardized data flow design and individualized user design interfaces means no such built application is inherently descriptive enough for a patent right/copyright, novel, or non-obvious enough for a utility patent nor ornamental enough for a design patent. As such the built applications themselves would have no statutory patent rights/copyrights.

Since no IP can be created, no license must be released, and all applications can be used by anyone without asking the designer's permission. This generally reduces costs, but also overall total demand for applications (Example: All pizza shop owners in the Nation, with pizza shop expertise, but no technical expertise, can build and use the same set of applications to run all aspects of pizza shops. No pizza shop owner building with gvml can claim to have invented anything unique with the language. They compete on pizza, not software).

Further, the disclosed system may be configured for writing computer applications is a business method that allows builder entity (though originally contemplated for public agencies, the builders could also be private companies, not-for-profits, or individuals) to easily create apps for ordinary users using standardized cards, presented in a standard form and order but presented to each user by their individualized user interface design. The integrity of each transaction is ensured by a hash chain transaction signature. By its very nature, this is business method is necessarily both computer-centric and Internet-centric.

Further, the disclosed system may be configured for allowing end-users to choose their application interface such that all applications-built look and act as the user chooses (Example: All websites look the same to each user, what the publisher designer loses in design choice, the end-user gains in learning curve). End users learn to use one app and know how to use them all. This ameliorates the inequality between the digitally savvy and those less advantaged. This also reduces the time cost of user switching services and thus makes it easier for new market entrants to gain customers.

Under the first step of the Supreme Court's 2014 Alice Corp. v. BLS Bank ruling, courts must decide whether the claims are directed to ineligible subject matter, such as an abstract idea. McRO, 837 F.3d at 1312; Internet Patents Corp. v. Active Network, Inc., 790 F.3d 1343, 1346 (Fed. Cir. 2015). The inquiry often is whether the claims are directed to "a specific means or method" for improving technology or, if instead, whether they are simply directed to an abstract end-result. McRO, 837 F.3d at 1314. If the claims are not directed to an abstract idea, the inquiry ends. Thales Visionix Inc. v. United States, 850 F.3d 1343, 1349 (Fed. Cir. 2017).

While "generalized steps to be performed on a computer using conventional computer activity" are abstract, Enfish, LLC v. Microsoft Corp., 822 F.3d 1327, 1338 (Fed. Cir. 2016), not all claims in all software patents are necessarily directed to an abstract idea, Ultramercial, Inc. v. Hulu, LLC, 772 F.3d 709, 712. court have "held that software patent claims satisfy Alice step one when they are "directed to a specific implementation of a solution to a problem in the software arts," such as an improvement in the functioning of a computer." Likewise, the present invention creates a technological solution to the problems (i.e. the often-steep learning curves in both writing and using each new computer applications) that prior art has not. "Because the present invention is directed to a specific improvement to computer functionality, the claims are not directed to an ineligible abstract idea." Speedtrack v. Amazon. Fed Cir.

Satisfying Alice step 1 is sufficient to make present invention patent-eligible. But even if step 1 was not satisfied, present invention satisfies step 2. In step two of the Alice inquiry, an "'inventive concept' is searched sufficient to 'transform the nature of the claim into a patent-eligible application.'" McRO, 837 F.3d at 1312 (quoting Alice, 134 S.Ct. at 2355). To save a patent at step two, an inventive concept must be evident in the claims. See Alice, 134 S.Ct. at 2357 ("[W]e must examine the elements of the claim to determine whether it contains an 'inventive concept.'" (emphasis added)); Synopsys, Inc. v. Mentor Graphics Corp., 839 F.3d 1138, 1149 (Fed. Cir. 2016) ("The § 101 inquiry must focus on the language of the Asserted Claims themselves.").

In DDR Holdings, LLC v. Hotels.com, L.P., the Federal Circuit held "that the patent *1328 claims satisfied Alice step two because "the claimed solution amounts to an inventive concept for resolving [a] particular Internet-centric problem". The present invention resolved a particular computer-centric (and most typically, Internet-centric) problem—namely it creates a system whereby software applications are made in such a way that there are no statutory patent rights/copyrights created, in particular, utility patent rights (since by its very design, any such application would necessarily fail the Patent Act's novelty and non-obvious requirements). The applicant is aware of the irony of seeking patent rights for a business method of expanding the Nation's intellectual commons with non-patentable, non-copyrightable Software but is confident the USPTO is also aware that some problems require paradoxical ("inventive", if you will) solutions. To analogize, although Samuel Morse's patent claim to invention of Morse Code was granted by this office, a telegraph carrier could not claim IP rights in any message it thereafter transmitted ("3rdly the use, system, formation, and arrangement of type and of signs, for transmitting intelligence between distant points, by the application of electro-magnetism, and metallic conductors combined with mechanism, described in the foregoing specification." U.S. Pat. No. 1667 (issued Jun. 20, 1840)). The telegraph operator, like the app builder using this invention, is an intermediary and not the end user. No claims are made whether the end user could assert IP rights. If, say, the New York Herald Tribune's London correspondent Karl Marx wired a story to the paper via telegram, the copyright to the telegram text would belong to the owner of the means of the production, the newspaper publisher. Likewise, if intermediary builder entity (most typically, a government agency) writes a messaging or word processing application by use of this invention, on which the end user drafts a document, the end user too would retain a copyright in the message created, unless the parties agree otherwise.

Further, the present disclosure describes a wizard suite. Further, a restaurant owner runs the wizard suite. Further, the wizard suite is made up of an ordering wizard, a kitchen wizard, a waiter wizard, and a delivery wizard.

Further, the ordering wizard, the kitchen wizard, the waiter wizard, and the delivery wizard may include electronic forms. Further, the electronic forms may be built with words (natural language). After adding any data such as sensor device data to the electronic forms the ordering wizard, the kitchen wizard, the waiter wizard, and the delivery wizard are called apps.

Further, a waiter app corresponding to the waiter wizard may be used to ping a waiter at a pizza shop to pick up a kitchen order. Further, the waiter is effectively starting a software wizard as is a kitchen staff, a customer, or a delivery guy. Further, the waiter, the kitchen staff, the customer, and the delivery gay are end-users also the restaurant owner is the end-users. Further, the restaurant owner may assign a person to be the waiter by giving that person a seat license (access) to the waiter app (wizard). Further, none of the end-users, of which some require seat licenses and some do not, are builders.

Further, the present disclosure does not describe the creative rights of the end-users. Further, the present disclosure describes the machine learning source code associated with the apps is from a limited dictionary such that the builder cannot make any choices with the source code logic. For example, if a builder wants to add GPS, but the builder can only use the location card which allows keys latitude and longitude to be captured by user tap. Since the builder is only describing a workflow and has no creative ability to change the words to uniquely describe the workflow, since any other same exact workflow must use the same exact words, then given the nature of software patents and copy writable source code, according to the case law no patent or copyright could be created.

Further, the present disclosure describes the use of GVML for creating an app. Further, the GVML is numbered, like lines of code, Further, a first example of an app using the GVML may be:
1. Form (titled "User Details")
1.1 First Name 1.2 Last Name
1.3 Cell Phone
1.4 Delivery Address
2. Menu
2.1 Menu data (input by end-user, the store owner)
2.2 Tax data
2.3 Total
3. Pay
3.1 Payment (one) Cash, Visa, Mastercard
3.2=2.3

Further, 1, 2, and 3 are official CARD names. Further, the cards may include certain usable keys. Further, 1.1-1.4, 2.1, 2.2, 2.3, and 3.1 are official keys. Further, a second example of the app, no FORM card is used with user data. Further, the second example may include adding a Location card. Further, the second example of the app using the GVML may be:

1.1 Menu data (input by end-user, the store owner)
1.2 Tax data
1.3 Total
2. Pay
2.1 Payment (one) Cash, Visa, Mastercard
2.2=1.3
3. Location
3.1 Latitude
3.2 Longitude Further, the present disclosure describes a builder of an app. Further, the builder does not control any of the machine-readable code of the app. Further, the logic that the machine reads is non-controllable. Further, the data that the end-user adds is added to a Menu Card of the app, via a wizard function when an end-user uses the app (Pizza Shop app), which was built by the builder who had no creative input. Further, saying a basic set of steps does not create anything. And since the builder doesn't control the software logic, the words used, therefore the builder gets to name nothing in the code. Also, the builder gets to control nothing in how the app works. Therefore, the builder invents nothing. If the end-user of a pizza shop owner names a pizza the "Big Bubba Fatty" then the end-user is not using the limited dictionary to build apps, the end-user is using a 50K word dictionary to creatively describe a pizza.

Further, the present disclosure describes an app. Further, the app is made using the GVML. When the GVML code goes thru to the other side it becomes the app. Further, the app could be used as an app to chat with Sally, or write a novel, or set up my pizza shop. Since a builder of the app can't change the GVML there is no creative invention opportunity for the builder. Further, the builder can build the app and yet invent nothing.

Referring now to figures, FIG. 1 is an illustration of an online platform 100 consistent with various embodiments of the present disclosure. By way of non-limiting example, the online platform 100 to facilitate creating a computer application based on a natural language may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1200.

Figure 2:
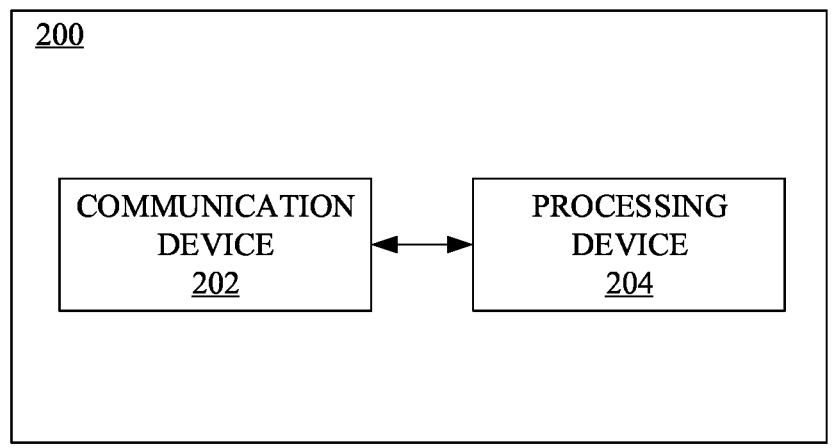
FIG. 2 is a block diagram of a system of facilitating creating a computer application based on a natural language, in accordance with some embodiments.

FIG. 2 is a block diagram of a system 200 of facilitating creating a computer application based on a natural language, in accordance with some embodiments. Accordingly, the system 200 may include a communication device 202 configured for receiving a request from a builder device. Further, the builder device may be associated with a builder. Further, the builder may be an individual that builds the computer application. Further, the communication device 202 may be configured for transmitting a user interface on the builder device. Further, the user interface may include a limited dictionary that may include a plurality of keys. Further, the user interface allows at least one builder to arrange selected keys from the plurality of keys in a sequence to generate a workflow. Further, each key of the plurality of keys corresponds to a specific function. Further, the limited dictionary circumscribes a scope of the computer application that may be created using the method, thereby the computer application created using the method may be neither novel nor non-obvious and therefore the computer application may be unpatentable and uncopyrightable. Further, the builder uses the limited dictionary to build the software application. Further, the builder may be limited by the limited dictionary in building the software application. Further, the building of the software by the builder may be uncopyrightable. Further, the communication device 202 may be configured for receiving the workflow from the builder device. Further, the system 200 may include a processing device 204 communicatively coupled with the communication device 202. Further, the processing device 204 may be configured for analyzing the workflow. Further, the processing device 204 may be configured for generating an application file based on the analyzing. Further, the processing device 204 may be configured for deploying the application file on at least one end-user device. Further, the at least one end-user device may be associated with at least one end-user. Further, the at least one end-user may be an individual that uses the software application built by the builder. Further, the at least one end-user may create at least one user content based on the software application. Further, the at least one user content created by the at least one end-user may be copyrightable.

Further, in some embodiments, the plurality of keys corresponds to a plurality of specific functions. Further, each specific function of the plurality of specific functions uniquely corresponds to a single key of the plurality of keys. Further, no creativity may be exercisable by the at least one builder in selecting a key for representing a specific function.

Further, in some embodiments, a plurality of workflows corresponds to a plurality of arrangements of the selected keys. Further, each workflow of the plurality of workflows uniquely corresponds to a single arrangement of the selected keys. Further, no creativity may be exercisable by the at least one builder in arranging the selected keys in the sequence for representing the workflow.

Further, in some embodiments, the limited dictionary may include less than 1500 keys.

Further, in some embodiments, the communication device 202 may be configured for receiving at least one user content from the at least one end-user device. Further, the at least one end-user may create the at least one user content. Further, the at least one user content may be subject to copyright protection. Further, the processing device 204 may be configured for integrating the at least one user content with at least one selected key of the selected keys of the workflow. Further, the generating of the application file may be based on the integrating. Further, the at least one user content may include at least one text content, at least one aural content, at least one visual content, at least one multimedia content, etc.

Further, in some embodiments, a key of the plurality of keys comprised in the limited dictionary may be associated with at least one of at most one predefined keyword and at most one predefined phrase associated with at least one natural language. Further, the at least one natural language may include at least one human language. Further, the at least one natural language may include English language, French language, Italian language, Spanish language, etc.

Further, in some embodiments, at least one key of the plurality of keys may be comprised in a card of at least one card. Further, the at least one key may be uniquely specific to the card. Further, the user interface allows the at least one builder to select the at least one card for further generating the workflow. Further, no creativity may be exercisable by the at least one builder in selecting the at least one card.

Further, in some embodiments, the user interface allows the at least one builder for arranging the at least one card in a card sequence for further generating the workflow. Further, no creativity may be exercisable by the at least one builder in arranging the at least one card.

Further, in some embodiments, a card of the at least one card may include two or more keys of the plurality of keys in a key sequence. Further, the key sequence of the two or more keys may be non-customizable.

Further, in some embodiments, the each key of the plurality of keys may be stored in a database. Further, the communication device 202 may be configured for receiving at least one new keyword from the builder device. Further, the communication device 202 may be configured for transmitting the at least one new keyword to an administrator device. Further, the communication device 202 may be configured for receiving a feedback from the administrator device. Further, the processing device 204 may be configured for updating the database with the at least one new keyword based on the feedback.

Further, in some embodiments, the computer application may include an electronic form. Further, arranging the selected keys from the plurality of keys in the sequence generating the workflow creates the electronic form. Further, the electronic form may include an input field configured to receive requested data and an output field configured to present presented data. Further, at least one of the requested data and the presented data may be associated with a legal process. Further, the at least one user content associated the at least one selected key may include the requested data and the presented data. Further, the requested data may include environmental data captured from at least one sensor comprised in the at least one user device. Further, in an embodiment, the at least one sensor may include at least one of a time sensor, a location sensor, an image sensor, a biometric sensor, a device state sensor, a physiological sensor, a motion sensor, and an orientation sensor.

Further, in some embodiments, the computer application may include an electronic form. Further, arranging the selected keys from the plurality of keys in the sequence generating the workflow creates the electronic form. Further, the electronic form may include an input field configured to receive requested data and an output field configured to present presented data. Further, at least one of the requested data and the presented data may be associated with a not-yet-legal process. Further, the at least one user content associated the at least one selected key may include the requested data and the presented data. Further, the requested data may include environmental data captured from at least one sensor comprised in the at least one user device.

Figure 3:
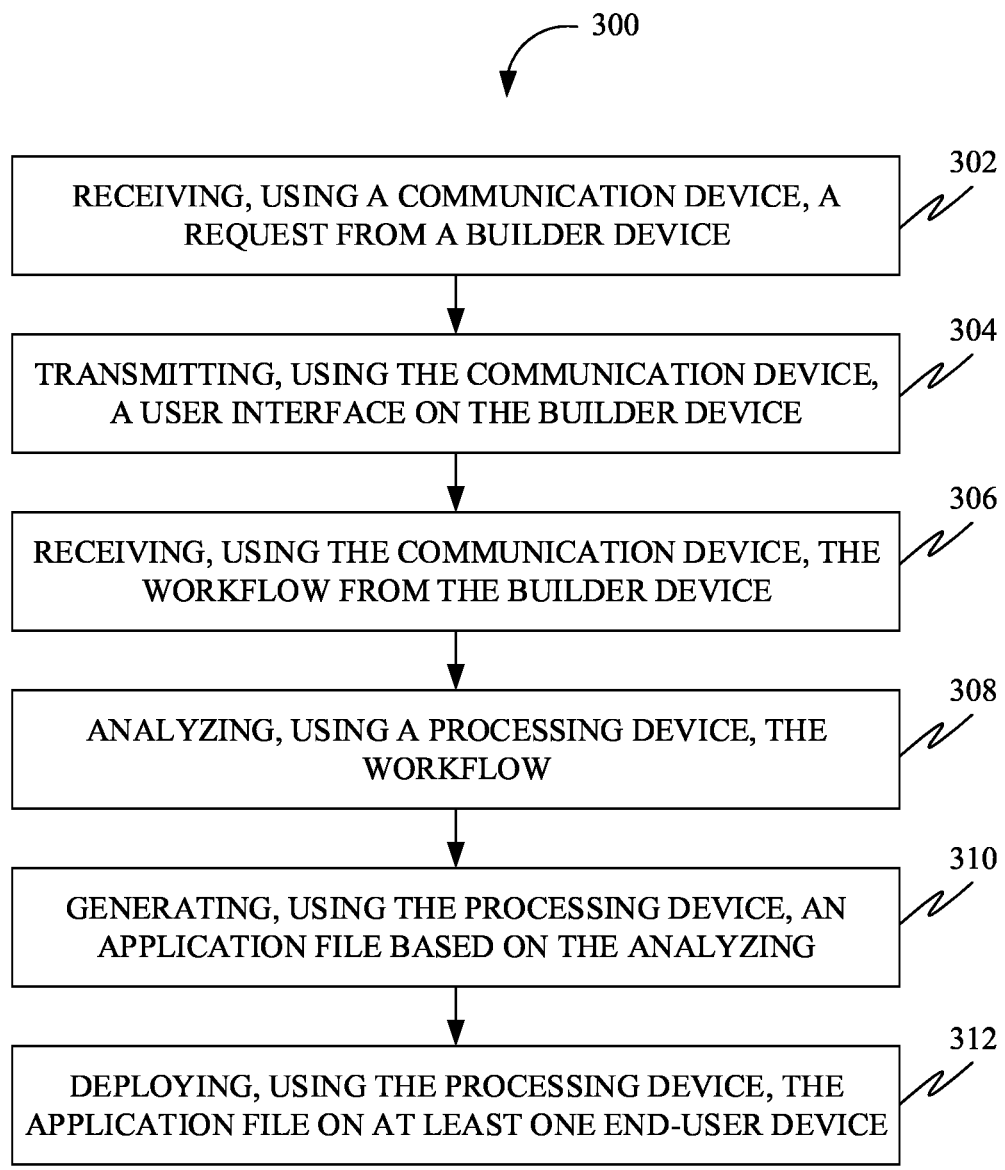
FIG. 3 is a flowchart of a method of facilitating creating a computer application based on a natural language, in accordance with some embodiments.

FIG. 3 is a flowchart of a method 300 of facilitating creating a computer application based on a natural language, in accordance with some embodiments. Accordingly, at 302, the method 300 may include receiving, using a communication device, a request from a builder device.

Further, at 304, the method 300 may include transmitting, using the communication device, a user interface on the builder device. Further, the user interface may include a limited dictionary may include a plurality of keys. Further, the user interface allows at least one builder to arrange selected keys from the plurality of keys in a sequence to generate a workflow. Further, each key of the plurality of keys corresponds to a specific function. Further, the limited dictionary circumscribes a scope of the computer application that may be created using the method 300, thereby the computer application created using the method 300 may be neither novel nor non-obvious and therefore the computer application may be unpatentable and uncopyrightable.

Further, at 306, the method 300 may include receiving, using the communication device, the workflow from the builder device.

Further, at 308, the method 300 may include analyzing, using a processing device, the workflow.

Further, at 310, the method 300 may include generating, using the processing device, an application file based on the analyzing.

Further, at 312, the method 300 may include deploying, using the processing device, the application file on at least one end-user device.

Further, in some embodiments, the plurality of keys corresponds to a plurality of specific functions. Further, each specific function of the plurality of specific functions uniquely corresponds to a single key of the plurality of keys. Further, no creativity may be exercisable by the at least one builder in selecting a key for representing a specific function.

Further, in some embodiments, a plurality of workflows corresponds to a plurality of arrangements of the selected keys. Further, each workflow of the plurality of workflows uniquely corresponds to a single arrangement of the selected keys. Further, no creativity may be exercisable by the at least one builder in arranging the selected keys in the sequence for representing the workflow.

Further, in some embodiments, the limited dictionary may include less than 1500 keys.

Further, in some embodiments, a key of the plurality of keys comprised in the limited dictionary may be associated with at least one of at most one predefined keyword and at most one predefined phrase associated with at least one natural language. Further, the at least one natural language may include at least one human language. Further, the at least one natural language may include English language, French language, Italian language, Spanish language, etc.

Further, in some embodiments, at least one key of the plurality of keys may be comprised in a card of at least one card. Further, the at least one key may be uniquely specific to the card. Further, the user interface allows the at least one builder to select the at least one card for further generating the workflow. Further, no creativity may be exercisable by the at least one builder in selecting the at least one card.

Further, in some embodiments, the user interface allows the at least one builder for arranging the at least one card in a card sequence for further generating the workflow. Further, no creativity may be exercisable by the at least one builder in arranging the at least one card.

Further, in some embodiments, a card of the at least one card may include two or more keys of the plurality of keys in a key sequence. Further, the key sequence of the two or more keys may be non-customizable.

Figure 4:
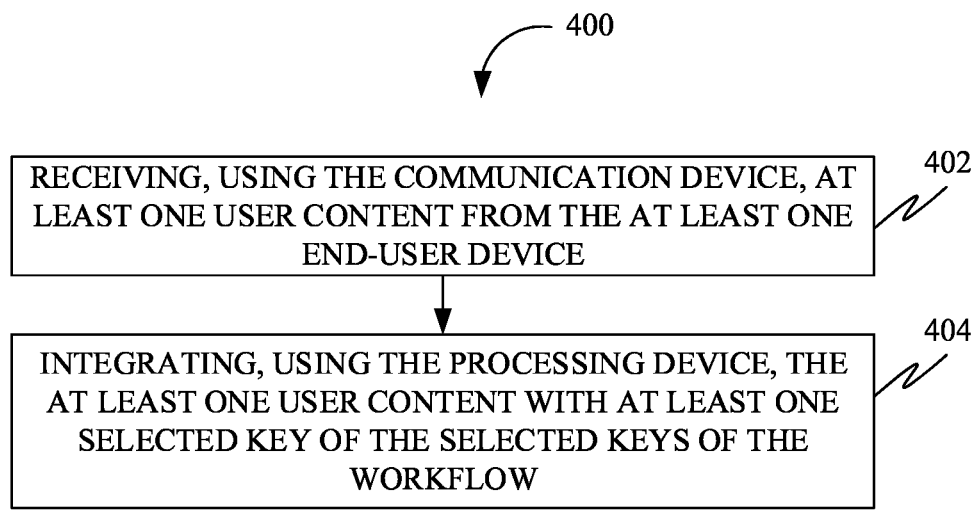
FIG. 4 is a flowchart of a method of integrating at least one user content with at least one selected key for facilitating creating the computer application based on the natural language, in accordance with some embodiments.

FIG. 4 is a flowchart of a method 400 of integrating at least one user content with at least one selected key for facilitating creating the computer application based on the natural language, in accordance with some embodiments. Accordingly, at 402, the method 400 may include receiving, using the communication device, at least one user content from the at least one end-user device. Further, the at least one user content may be subject to copyright protection. Further, the at least one user content may include at least one text content, at least one aural content, at least one visual content, at least one multimedia content, etc.

Further, at 404, the method 400 may include integrating, using the processing device, the at least one user content with at least one selected key of the selected keys of the workflow. Further, the generating of the application file may be based on the integrating.

Figure 5:
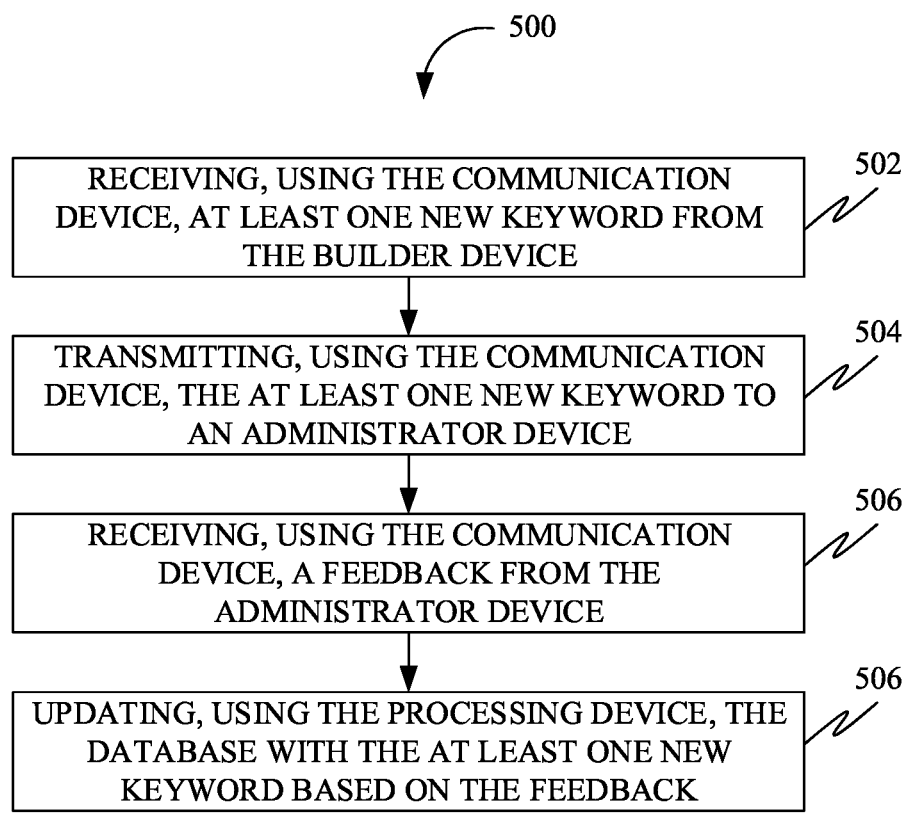
FIG. 5 is a flowchart of a method of updating a database with at least one new keyword for facilitating creating the computer application based on the natural language, in accordance with some embodiments.

FIG. 5 is a flowchart of a method 500 of updating a database with at least one new keyword for facilitating creating the computer application based on the natural language, in accordance with some embodiments. Accordingly, the each key of the plurality of keys may be stored in a database. Further, at 502, the method 500 may include receiving, using the communication device, at least one new keyword from the builder device.

Further, at 504, the method 500 may include transmitting, using the communication device, the at least one new keyword to an administrator device.

Further, at 506, the method 500 may include receiving, using the communication device, a feedback from the administrator device.

Further, at 508, the method 500 may include updating, using the processing device, the database with the at least one new keyword based on the feedback.

Figure 6:
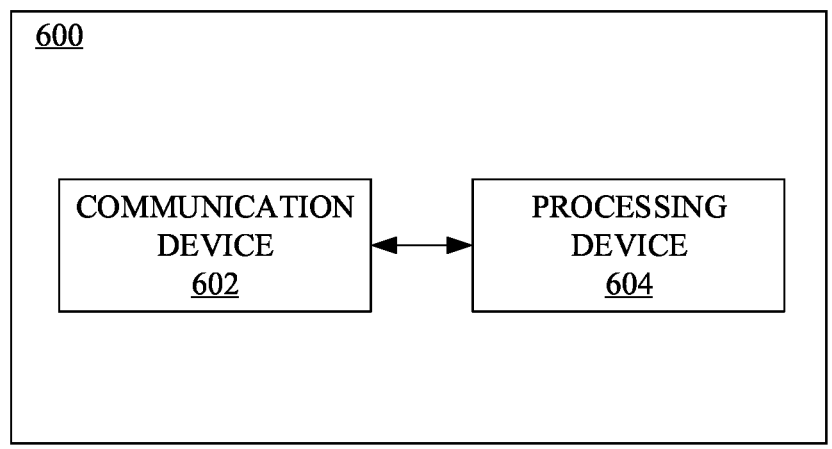
FIG. 6 is a system of facilitating creating computer applications based on a natural language, in accordance with some embodiments.

FIG. 6 is a system 600 of facilitating creating computer applications based on a natural language, in accordance with some embodiments. In some embodiments, the computer applications may be "blank forms" in which no patent rights/copyrights may be created. Further, in some embodiments, the natural language may include a globally standardized human markup language.

Accordingly, the system 600 may include a communication device 602 configured for receiving a request from a builder device. Further, the builder device, in an instance, may be any device that may be operated by a user that may wish to create the computer applications (such as, but not limited to, mobile applications and/or web application) using natural language. For example, the builder device may be one of the electronic device 106 and/or the mobile device 104.

Further, the communication device 602 may be configured for transmitting a user interface on the builder device. Further, the user interface may include a plurality of keys. In some embodiments, a key in the plurality of keys may be associated with at least one of a predefined keyword and a predefined phrase. Further, the predefined keywords and the predefined phrases, in an instance, may be letters/words/phrases in the natural language that may be already defined in a database (such as database 114) and/or may have a special meaning to a compiler. Further, in some embodiments, a key in the plurality of keys may be associated with a building block. Further, the building block may include two or more predefined keywords and predefined phrases in a predefined sequence. Further, in some embodiments, the building blocks, in an instance, may include multimedia content such as (but not limited to) a visual content, an audio content, an audiovisual content, and so on. Further, the user interface may allow at least one builder to arrange keys from the plurality of keys in a sequence to generate a workflow. Further, the at least one builder, in an instance, may be an individual and/or an organization that may wish to create the computer application by using the plurality of keys. Further, the at least one builder, in an instance, may not be having skills to use computer programing languages for creating the computer applications. Further, in some embodiments, the user interface may include a search section. Further, the search section may allow the at least one builder to search for a key in the plurality of keys. For instance, the at least one builder may search for the key (e.g. a word) by interacting with the user device (e.g. by typing the word through an on-screen/physical keyboard associated with the builder device such as a smartphone).

Further, the communication device 602 may be configured for receiving the workflow from the builder device. In some embodiments, the workflow may include a unique sequence of the plurality of keys. Further, the unique sequence of the plurality of keys may be prepared by the at least one builder through the builder device.

Further, the system 600 may include a processing device 604 configured for analyzing the workflow. Accordingly, the analyzing may include processes such as (but is not limited to) semantic analysis, data extraction (e.g. numerical value extraction, format conversion, etc.), data analysis (e.g. statistical analysis, etc.), image analysis (e.g. OCR, object recognition, face recognition, etc.), audio analysis (e.g. speech recognition, speaker recognition, etc.) and so on. For instance, the processing device 604 may analyze the unique sequence associated with the plurality of keys in the workflow to determine a function corresponding to the computer application.

Further, the processing device 604 may be configured for generating an application file based on the analyzing. In some embodiments, the application file may be stored in a database (such as the database 114) before deploying the application file.

Further, the processing device 604 may be configured for deploying the application file on at least one end-user device. Further, the at least one end-user device, in an instance, may be a user device operated by an end-user that may wish to use the computer application generated by the at least one builder through the builder device. Further, the at least one end-user device, in an instance, may include IoT based devices such as (but not limited to) smartphones, smartwatches, laptops, tablets, PCs, televisions, etc. Further, in some embodiments, the at least one end-user device may include the builder device.

In further embodiments, the application file may include at least one of a presented data and an environmental data. Further, the presented data may include a language attribute. Further, the environmental data may include a location data associated with the at least one end-user device. In some embodiments, the environmental data may be captured from at least one sensor comprised in the at least one end-user device. In some embodiments, the processing device 604 may be configured for updating the presented data based on the environmental data. For instance, the application file deployed on an end-user device that may be located at a location, for instance, Beijing, then the presented data (such as language) associated with the application file may be updated (e.g. in Mandarin) based on the environmental data (such as a location of the end-user device).

Further, in some embodiments, the at least one sensor comprised in the at least one end-user device may include a plurality of environmental sensors configured for sensing a plurality of variables. Further, the plurality of environmental sensors may include, but is not limited to, a timing device (e.g. a real-time clock), a location sensor (e.g. a GPS receiver, a GLONASS receiver, an indoor location sensor, etc.), a biometric sensor (e.g. a fingerprint sensor, an iris sensor), an environmental variable sensor (e.g. temperature sensor, humidity sensor, pressure sensor, a gas sensor, a chemical sensor, etc.) and a device state sensor (e.g. a power sensor, a voltage/current sensor, a switch-state sensor, a usage sensor, etc.), a physiological sensor (e.g. heart rate sensor, respiratory rate sensor, blood pressure sensor, EMG sensor, EEG sensor, ECG sensor, etc.) a motion sensor (e.g. an accelerometer, a speed sensor, etc.) an orientation sensor (e.g. magnetic compass, gyroscope, etc.) and so on.

In further embodiments, the system 600 may include the processing device 604 configured for generating a blockchain based on the application file. Further, the processing device 604 may be configured for verifying integrity of the application file based on the blockchain. Further, the system 600 may include a storage device configured for storing the blockchain in association with the application file.

In further embodiments, each key of the plurality of keys may be stored in a database. Further, the system 600 may include the communication device 602 configured for receiving at least one new keyword from the builder device. Further, the communication device 602 may be configured for transmitting the at least one new keyword to an administrator device. Further, the communication device 602 may be configured for receiving a feedback from the administrator device. Further, the processing device 604 may be configured for updating the database with the at least one new keyword based on the feedback.

Figure 7:
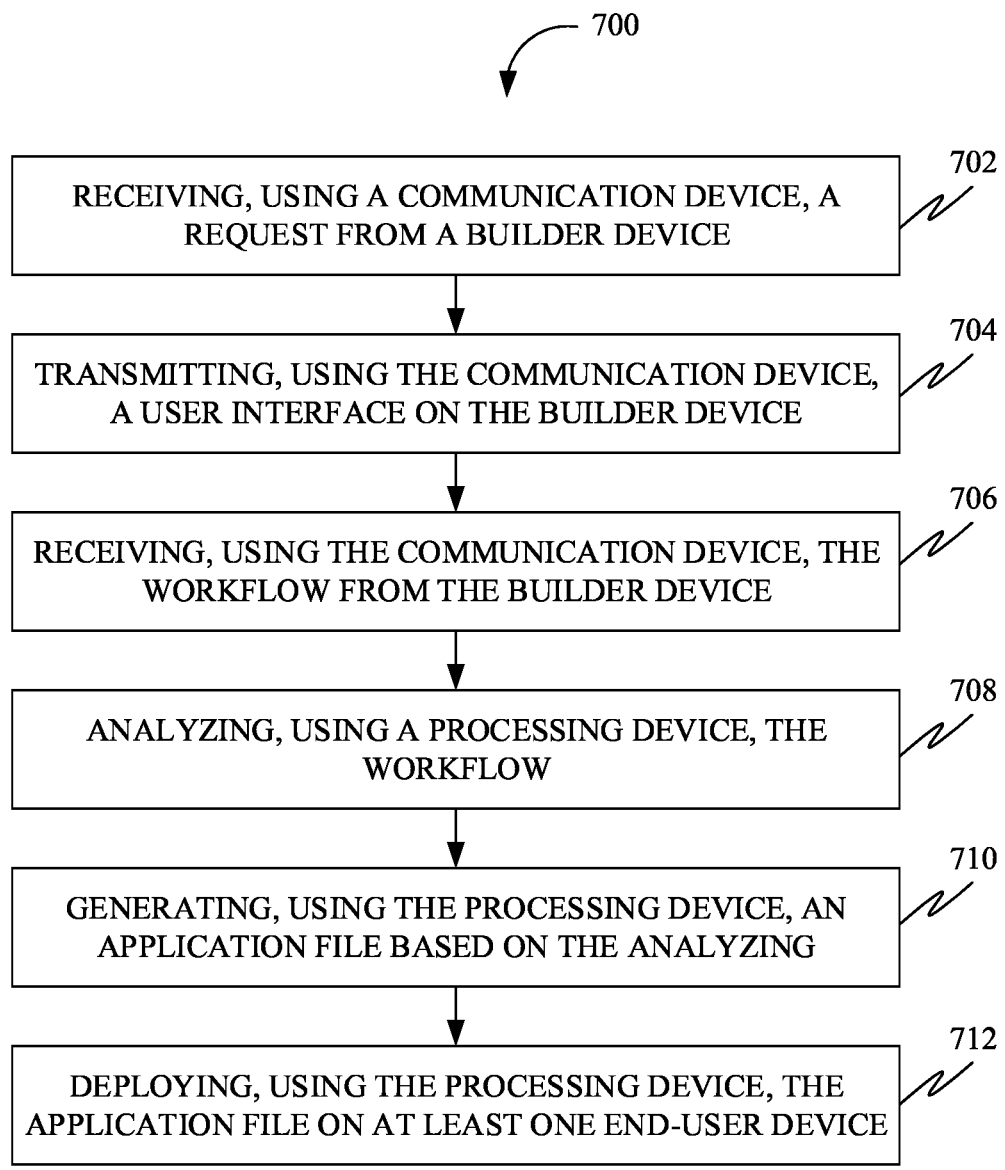
FIG. 7 is a flowchart of a method of facilitating creating computer applications based on a natural language, in accordance with some embodiments.

FIG. 7 is a flowchart of a method 700 of facilitating creating computer applications based on a natural language, in accordance with some embodiments. In some embodiments, the computer applications may be "blank forms" in which no patent rights/copyrights may be created. Further, in some embodiments, the natural language may include a globally standardized human markup language.

Accordingly, at 702, the method 700 may include receiving, using a communication device (such as the communication device 602), a request from a builder device.

Further, at 704, the method 700 may include transmitting, using the communication device, a user interface on the builder device. Further, the user interface may include a plurality of keys. In some embodiments, a key in the plurality of keys may be associated with at least one of a predefined keyword and a predefined phrase. Further, in some embodiments, a key in the plurality of keys may be associated with a building block. Further, the building block may include two or more predefined keywords and predefined phrases in a predefined sequence. Further, the user interface may allow at least one builder to arrange keys from the plurality of keys in a sequence to generate a workflow. In some embodiments, the user interface may include a search section. Further, the search section may allow the at least one builder to search for a key in the plurality of keys.

Further, at 706, the method 700 may include receiving, using the communication device, the workflow from the builder device. In some embodiments, the workflow may include a unique sequence of the plurality of keys. Further, the unique sequence of the plurality of keys may be prepared by the at least one builder through the builder device.

Further, at 708, the method 700 may include analyzing, using a processing device (such as the processing device 604), the workflow.

Further, at 710, the method 700 may include generating, using the processing device, an application file based on the analyzing.

Further, at 712, the method 700 may include deploying, using the processing device, the application file on at least one end-user device.

In further embodiments, the application file may include at least one of a presented data and an environmental data. Further, the presented data may include a language attribute. Further, the environmental data may include a location data associated with the at least one end-user device. In some embodiments, the environmental data may be captured from at least one sensor comprised in the at least one end-user device. In some embodiments, the method 700 may further include updating, using the processing device, the presented data based on the environmental data.

Figure 8:
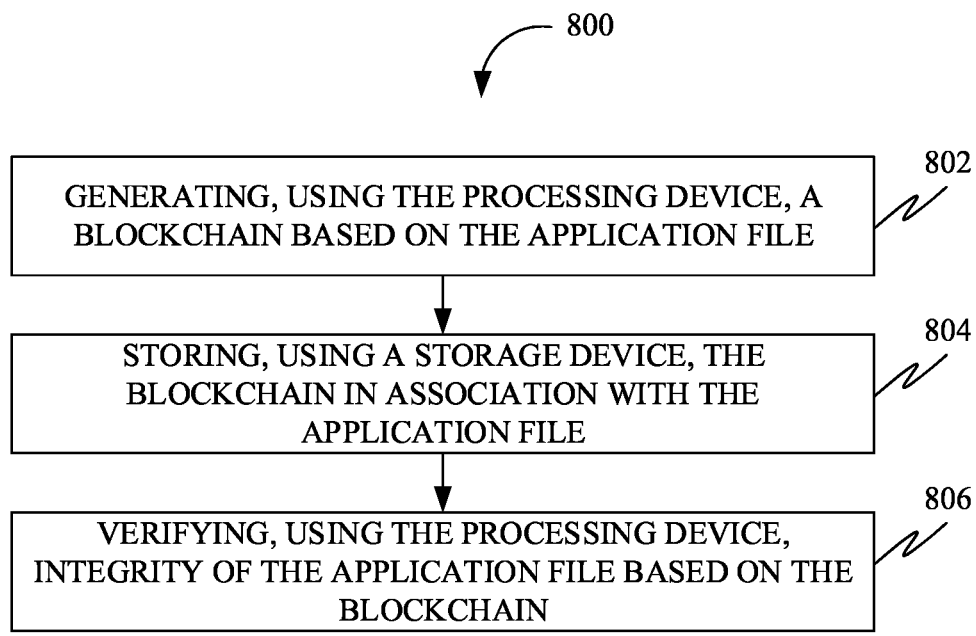
FIG. 8 is a flowchart of a method to facilitate maintaining integrity of the application file, in accordance with further embodiments.

FIG. 8 is a flowchart of a method 800 to facilitate maintaining integrity of the application file, in accordance with further embodiments. Accordingly, at 802, the method 800 may include generating, using the processing device, a blockchain based on the application file. Further, at 804, the method 800 may include storing, using a storage device, the blockchain in association with the application file. Further, at 806, the method 800 may include verifying, using the processing device, integrity of the application file based on the blockchain. In further embodiments, each key of the plurality of keys may be stored in a database.

Figure 9:
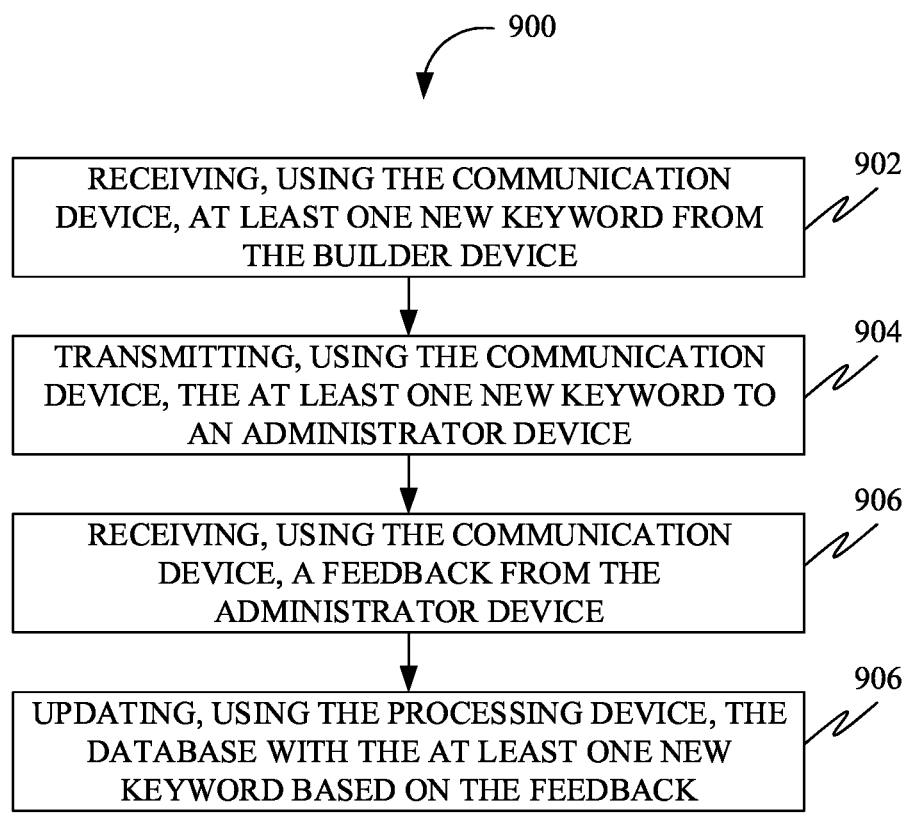
FIG. 9 is a flowchart of a method to facilitate adding a new keyword to the database.

FIG. 9 is a flowchart of a method 900 to facilitate adding a new keyword to the database. Accordingly, at 902, the method 900 may include receiving, using the communication device, at least one new keyword from the builder device. Further, at 904, the method 900 may include transmitting, using the communication device, the at least one new keyword to an administrator device. Further, at 906, the method 900 may include receiving, using the communication device, a feedback from the administrator device. Further, at 908, the method 900 may include updating, using the processing device, the database with the at least one new keyword based on the feedback.

Figure 10:
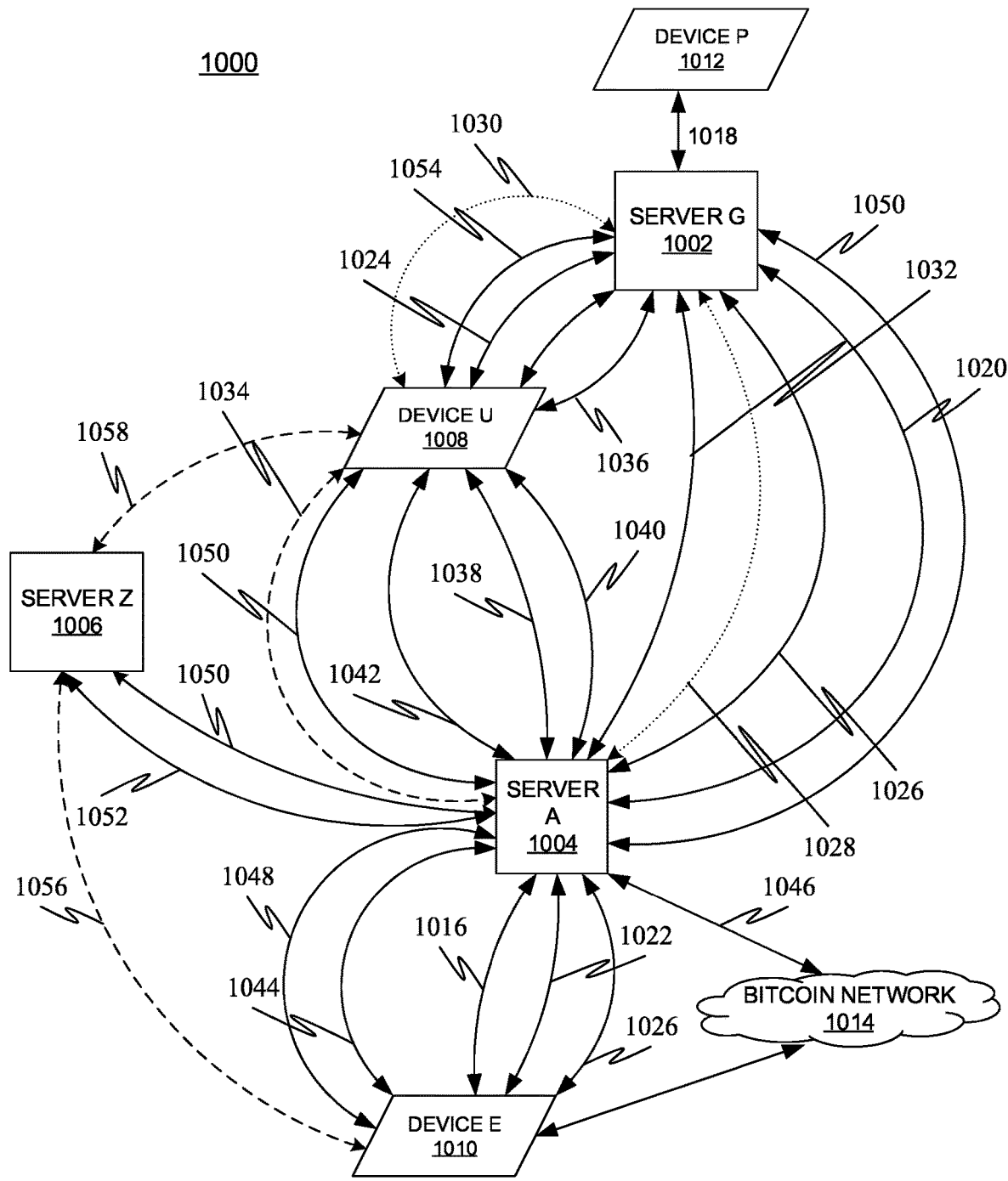
FIG. 10 is a system facilitating creating computer applications based on a natural language, in accordance with some embodiments.

FIG. 10 is a system 1000 facilitating creating computer applications based on a natural language, in accordance with some embodiments. The system 1000 includes a server G 1002, a server A 1004, a server Z 1006, a device U 1008, a device E 1010, and a device P 1012. Further, in reference to FIG. 10, the Server G 1002 may be a Govwhiz server, the Server A 1004 may be an offsite Builder server, the Server Z 1006 may be an onsite Agency "zombie apocalypse" backup server, the device U 1008 may be a User's smartphone or computer, the device E 1010 may be an Agency Employee's smartphone or computer, and the device P 1012 may be a Govwhiz Programmer Further, blockchain network 1014 (or similar such blockchain network), in an instance, is where hash chain transaction signature receipts may be stored.

A Builder, in an instance, is an application creation software that uses master key pairs and formatting to ensure common user experience (subject to User Design) across user applications in use by any Agency (such as government agency and/or private sector organization) using the system 1000 (may be referred to as Softlaw system). Further, the Builder may be operated by the device E 1010 or by the device P 1012. Further, communication between various elements in FIG. 10 typically by internet through local area network, Ethernet, or Wi-Fi connection possible in emergency use by the device U 1008 and/or the device E 1010 when communicating with the Server Z 1006. Further, User Design, in an instance, may be a software loaded on device U 1008 that may allow each user to choose a user interface design of his/her choice.

An exemplary workflow may include using the builder creating and uploading applications by the device E 1010 (over a communication path 1016) or the device P 1012 (over a communication path 1018). Further, the builder generated applications may be shared between the server A 1004 and the server G 1002, over a communication path 1020. The device E 1010 may be used to register the server A 1004 with the server G 1002, over a communication path 1022. Further, the device U 1008 may be used to register the user with the server G 1002 over a communication path 1024. The device U 1008 may be used to confirm user identity to the server G 1002 over a communication path 1026. The server A 1004 session login may be permanent, as depicted by 1028. The device U 1008 login may extend for 15 minutes, as depicted by 1030. The server G 1002 may be authorized with the server A 1004 (as depicted by 1032) and the device U 1008 (as depicted by 1054). The server A 1004 and the device U 1008 may be connected directly over a communication path 1034. The server G 1002 may auto-fill a filing document on the device U 1008, as depicted by 1036. The device U 1008 may be used to input remaining information needed, as depicted by 1038. The device U 1008 may send a filing document to the server A 1004 over a communication path 1040. The server A 1004 may check the filing document for errors and then either send an erroneous incomplete document back to the device U 1008 and/or inform the device U 1008 that the document is error-free and complete over a communication path 1042. The server A 1004 may encode session ID with Shaw 2 hash, as depicted by 1044. The server A 1004 may send an encrypted document to the blockchain over a communication path 1046. The server A 1004 may store plain language markup code receipt with blockchain key, transmitted over a communication path 1048. The server A 1004 may send a copy of a receipt to the device U 1008, the server Z 1006, and the server G 1002, over a communication path 1050. In emergency mode (e.g. public emergency with internet unavailable), the server Z 1006 may communicate directly via local area network to the device E 1010 (as depicted by 1056) and the device U 1008 (as depicted by 1058). Post-emergency with internet restored, any new transaction may be sent to the server A 1004 over a communication path 1052.

Figure 11:
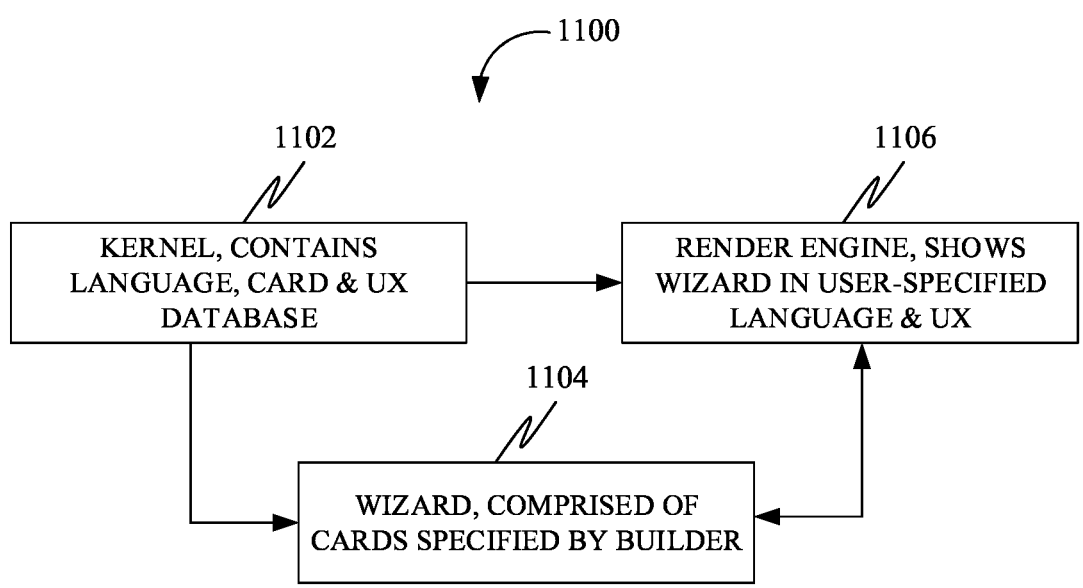
FIG. 11 is an exemplary representation of a system facilitating creating computer applications based on a natural language, in accordance with some exemplary embodiments.

FIG. 11 is an exemplary representation of a system 1100 facilitating creating computer applications based on a natural language, in accordance with some exemplary embodiments. Accordingly, the system 1100 may include a kernel 1102, a wizard 1104, and/or a render engine 1106. Further, in reference to FIG. 11, the kernel 1102, in an instance, may be a storage device configured to hold master keys and define namespace associated with the master keys. Further, each Nation-State, using the disclosed system, may have a default, or native, human language term for each master key, but also an ability to set alternative human language terms. For example, a Canadian English key for "date of birth" may be identical as a Canadian French key for "date de naissance." Further, the native human language keys may be the keys in key-value pairs that define the master key pairs, the basic building blocks of wizard 1104. Further, the wizard 1104, in an instance, may be a virtual application that may be built and run by the present invention.

Further, in some embodiments, the kernel 1102 may contain a master key pair database and a language database (which is, e.g., a list of human languages in which to access the master keypair database).

Further, the kernel 1102 may also contain a UX database for a wizard user to select a common display format for the wizard 1104 that the wizard user may use.

Since the master keypair structures are the same globally (with UX selected by the wizard user), and there may be only one way to program any given process when making the wizard 1104 for it, nothing unique may ever be created by builder or agency offering the wizard 1104 to users.

Further, any given process can only be written one way, often multiple processes are written the same way only distinguished by purpose. Since anyone describing the same process would use the same key pairs, and simply describing a process isn't patentable. Anything can be built with the disclosed system, but nothing can be invented.

Further, the wizard 1104 may express themselves by use of a render engine 1106 in one or more of mobile applications, browser applications, Television applications, and desktop applications, and the internet of things (in a most common embodiment, these would be virtual applications running inside a mobile application). Further, the render engine 1106 may express the kernel 1102 master key pair DB (Database) selections made by a wizard Agency and the kernel language DB and UX DB selections made by the wizard user. For example, a wizard Builder (and/or agency) in Baltimore might use US English to build a wizard 1104, and those keys used to resolve to their master keys in kernel 1102, so when a wizard Agency or end-user in Beijing opens the wizard 1104, their selected language and UX may be pulled from the kernel 1102 may have the same functional wizard 1104 in Mandarin.

Figure 12:
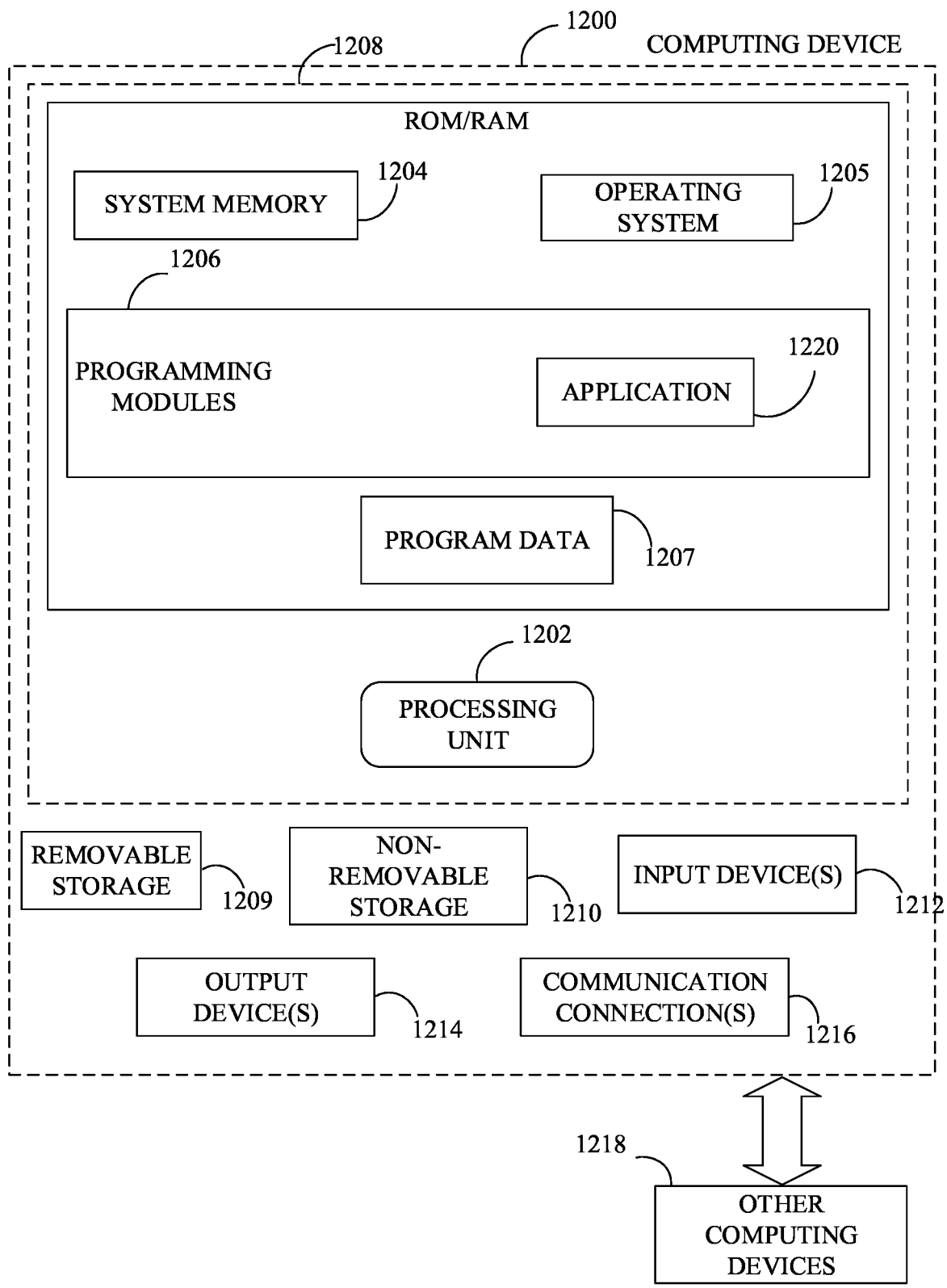
FIG. 12 is a block diagram of a computing device for implementing the methods disclosed herein, in accordance with some embodiments.

With reference to FIG. 12, a system consistent with an embodiment of the disclosure may include a computing device or cloud service, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random-access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 1200's operation. In one embodiment, programming modules 1206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and non-volatile, removable and non-removable media implemented in any method or technology for storage of information, such as computer-readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, a location sensor, a camera, a biometric sensor, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., application 1220) may perform processes including, for example, one or more stages of methods, algorithms, systems, applications, servers, databases as described above. The aforementioned process is an example, and processing unit 1202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

DETAIL DESCRIPTIONS OF THE EMBODIMENTS

In accordance with some embodiments, a method of provision of computer applications by a builder, whereby the applications are "blank forms" in which no patent rights/copyrights are created, is disclosed. The method may include generating, using a processing device, a computer application based on a master key-value pair data format, that requires no technical software coding skill & uses the Agency's native human language to describe, by use of a natural language input device, their desired workflow. Further, the method may allow an end-user, by use of a natural language choose a device, to choose his/her user interface design that may be identical with each such application that the end-user may use. Further, the method may include a common data dictionary maintained, by use of a storage device, for all builders by a single Authority, so each computer instruction, as chosen by the builder into a processing device may be written in a specified way. Further, computer instructions for each step or submodule of the final application may be grouped, by use of a processing device and stored, by use of a storage device as master key pair. Further, each master key pair may be stored, by using a storage device, in a common format and order of presentation, easily adaptable to other builders with a need for a similar application. In some embodiments, different applications running on a processing device may require the use of different master key pairs, each master key pair may be a separate submodule that may run in a database, by use of a processing device, operated by Authority, in one or more containers.

Further, in some embodiments, each master key pair that may be presented, by use of an output device, to the end-user may be in a standard design and format established and maintained by the operating system Authority. Further, the end-user may run, by use of a processing device, a User Design module on a device (operated by the end-user) to establish a user interface design common to all applications run using the disclosed system. Further, when the end-user logs in, by use of the device, and selects, by use of a processing device a particular application, the Agency's device may (by use of a processing device) group together and provide access to the necessary submodules comprising the selected application or virtual application in visual appearance selected by User Design.

Further, the builder, in an instance, may have no input into the creation of submodules he/she may include in computer application and/or may have no input into how the end-user may choose to express output fields, by use of graphical interface device as seen by the user. Thus the builder's computer application may be akin to a mere blank form, lacking any patent rights/copyrights. Further, to keep the operating system from forking into incompatible iterations, no computer application may be built or used without the approval of the Authority. In another embodiment, there may be a global repository of approved applications, maintained by Authority, offered freely without a license of any kind, because builders by using the "applications as blank forms" invention have not invented anything. In another embodiment, there may be a global directory of applications approved by Authority that may be hosted as a service on private or public servers by for-profit, non-profit, or public/government entities for profit, at cost, or for free. In another embodiment, there may also be a backup/emergency cluster server, physically collocated near Agency, for when the internet may not be available. Further, the emergency server may hold, by use of a storage device, both all Authority-approved applications, Builder tools as well as Authority's data format and login modules. Further, the emergency server may allow the user's device to access Agency's server, by use of a local area network, even in an absence of internet service. In another embodiment, an emergency server may be used in a non-emergency situation, namely, translating old applications and data coded in legacy computer languages to another computer language.

In accordance with some embodiments, a system of provision of computer applications by a builder, whereby the applications are "blank forms" in which no patent rights/copyrights are created, is disclosed. Further, the system may be configured to generate a computer application based on a master key-value pair data format, which may require no technical software coding skill & may use the Builder's native human language to describe, by use of a natural language input device, their desired workflow. Further, the system may be configured to allow an end-user to choose his/her native human language and user interface design that may be identical with each such application that the end-user may use.

In one embodiment, the system may be configured to include a storage device, or KERNEL, that may hold the master keys and may define their namespace associated with the master keys. Further, each Builder and Agency (that may be using the system) may have, depending on human language understood by their intended users, a default human language term for each key, but also the ability, by use of natural language input device, to set alternative language terms, allowing Agency to serve users in a plurality of human languages. Further, such human language keys are the keys in key-value pairs that may define the master key pairs, the basic building blocks of WIZARDS (the virtual applications that may be built and run, by use of a processing device, by the system). Further, the KERNEL may contain, by use of a storage device, a master key pair database, and a human language database. Further, there may be a UX database for the Wizard end user to select a common display format for whatever WIZARDS the end-user may use. Since the master keypair structures may be the same globally (with UX selected by the Wizard user), and there may only be one way to program, by use of natural language input device and processing device, any given process when making a WIZARD for it, nothing unique may ever be created by Wizard Builders or Agencies.

Further, any given process can only be written one way, often multiple processes are written the same way only distinguished by purpose. Since anyone describing the same process would use the same key pairs, and simply describing a process isn't patentable. Anything can be built with the disclosed system, but nothing can be invented.

Further, the system may be configured so that the WIZARDS may express themselves by use of a processing device, or RENDER ENGINE, in one or more of mobile applications, browser applications, Television applications, and desktop applications, voice-based applications, and the internet of things. Further, the system may be configured so RENDER ENGINE would express the KERNEL master key pair DB (database) selections made, by use of natural language input device of WIZARD Agency and the KERNEL language DB and UX DB selections made by the wizard user. In another embodiment, there may be a global repository of approved applications, maintained by Authority, offered freely without the license of any kind, because builders by using the "applications as blank forms" invention have not invented anything. In another embodiment, there may be a global directory of applications approved by Authority that may be hosted as a service on private or public servers by for profit, non-profit, or public/government entities for profit, at cost, or for free. In another embodiment, the system may be configured so that there may be an emergency server physically collocated near Agency, which may contain KERNEL DB and login modules as well as all WIZARDS authorized by Authority. In another embodiment, in non-emergency cases where internet service may be unavailable, the Agency or end-user may log in by use of local area network to have access to WIZARD and WIZARD Builder tools. In another embodiment, in non-emergency situations, agencies and end-users may have access to WIZARDS and Wizard Builder Tools to facilitate translation of applications and data coded in an old computer language.

Further, as stated above, the Authority control Kernel—a data dictionary of keys master key pair. One embodiment of this may be to provide one key titled location. GPS elevation and another key titled location.Baro. Further, these two keys may provide the same or, rather (due to constraints of technology) nearly the same information—Above Mean Sea Level elevation ("elevation"). Further, data may be inputted into Keys by keyboard or by one or more combinations of sensors or even other keys. Further, GPSelevation may contain data reported by a GPS phone sensor for two other keys, key location. longitude and location. latitude, a lookup table may be used to hand back elevation at that mark. Meanwhile the key location. Further, baro may get an air pressure read if there may be an onboard barometer to derive barometric elevation. Therefore, there may be at least two ways to derive elevation but each may have a master key and only one master key. Further, the keys may be numbered consecutively (e.g. 1, 2, 3, 4, 5 and so on). Further, Baro might be key 759, when the user selects a default language OR they may be required to use one by WIZARD Agency—they may be downloading and storing locally the numbered key to the master key so now it's 759 location. For instance, Baro (master key)=barómetro (natural language key)—the user is now reading Spanish from their MK data dictionary, so now the KEY in their application may read "barómetro" and the application may be receiving the Value from the phone associated with the user.

Further, the user may select a language and that may populate their MK data dictionary and the value from their language may now be used as the key. Further, the Master Key may get matched to a Natural Language Key (NLK) and the NLK may be used to populate their application. This is how people may be able to build applications in their natural language because when complete, their application may be mastered to the Master Keys and that official wizard document may be stored by Authority in MK format. Further, anyone who may open that MK document may have the values in that MK translated by their selected NLK, making the MK document readable in their language. Further, 7 conversion of these values from one NLK to another may be accomplished by existed art provided by commercially available translation software packages.

What is claimed is:

1. A method of facilitating creating a computer application based on a natural language, the method comprising:
receiving, using a communication device, a request from a builder device;
transmitting, using the communication device, a user interface on the builder device, wherein the user interface comprises a limited dictionary comprising a plurality of keys, wherein the user interface allows at least one builder to arrange selected keys from the plurality of keys in a sequence to generate a workflow, wherein each key of the plurality of keys corresponds to a specific function, wherein the limited dictionary circumscribes a scope of the computer application that is created using the method, thereby the computer application created using the method is neither novel nor non-obvious and therefore the computer application is unpatentable and uncopyrightable;
receiving, using the communication device, the workflow from the builder device;
analyzing, using a processing device, the workflow;
generating, using the processing device, an application file based on the analyzing; and
deploying, using the processing device, the application file on at least one end-user device.

2. The method of claim 1, wherein the plurality of keys corresponds to a plurality of specific functions, wherein each specific function of the plurality of specific functions uniquely corresponds to a single key of the plurality of keys, wherein no creativity is exercisable by the at least one builder in selecting a key for representing a specific function.

3. The method of claim 1, wherein a plurality of workflows corresponds to a plurality of arrangements of the selected keys, wherein each workflow of the plurality of workflows uniquely corresponds to a single arrangement of the selected keys, wherein no creativity is exercisable by the at least one builder in arranging the selected keys in the sequence for representing the workflow.

4. The method of claim 1, wherein the limited dictionary comprises less than 1500 keys.

5. The method of claim 1 further comprising:
receiving, using the communication device, at least one user content from the at least one end-user device, wherein the at least one user content is subject to copyright protection; and
integrating, using the processing device, the at least one user content with at least one selected key of the selected keys of the workflow, wherein the generating of the application file is further based on the integrating.

6. The method of claim 1, wherein a key of the plurality of keys comprised in the limited dictionary is associated with at least one of at most one predefined keyword and at most one predefined phrase associated with at least one natural language.

7. The method of claim 1, wherein at least one key of the plurality of keys is comprised in a card of at least one card, wherein the at least one key is uniquely specific to the card, wherein the user interface allows the at least one builder to select the at least one card for further generating the workflow, wherein no creativity is exercisable by the at least one builder in selecting the at least one card.

8. The method of claim 7, wherein the user interface allows the at least one builder for arranging the at least one card in a card sequence for further generating the workflow, wherein no creativity is exercisable by the at least one builder in arranging the at least one card.

9. The method of claim 7, wherein a card of the at least one card comprises two or more keys of the plurality of keys in a key sequence, wherein the key sequence of the two or more keys is non-customizable.

10. The method of claim 1, wherein the each key of the plurality of keys is stored in a database, wherein the method further comprising:
receiving, using the communication device, at least one new keyword from the builder device;
transmitting, using the communication device, the at least one new keyword to an administrator device;
receiving, using the communication device, a feedback from the administrator device; and
updating, using the processing device, the database with the at least one new keyword based on the feedback.

11. A system of facilitating creating a computer application based on a natural language, the system comprising:
a communication device configured for:
receiving a request from a builder device;
transmitting a user interface on the builder device, wherein the user interface comprises a limited dictionary comprising a plurality of keys, wherein the user interface allows at least one builder to arrange selected keys from the plurality of keys in a sequence to generate a workflow, wherein each key of the plurality of keys corresponds to a specific function, wherein the limited dictionary circumscribes a scope of the computer application that is created using the method, thereby the computer application created using the method is neither novel nor non-obvious and therefore the computer application is unpatentable and uncopyrightable; and
receiving the workflow from the builder device; and
a processing device communicatively coupled with the communication device, wherein the processing device is configured for:
analyzing the workflow;
generating an application file based on the analyzing; and
deploying the application file on at least one end-user device.

12. The system of claim 11, wherein the plurality of keys corresponds to a plurality of specific functions, wherein each specific function of the plurality of specific functions uniquely corresponds to a single key of the plurality of keys, wherein no creativity is exercisable by the at least one builder in selecting a key for representing a specific function.

13. The system of claim 11, wherein a plurality of workflows corresponds to a plurality of arrangements of the selected keys, wherein each workflow of the plurality of workflows uniquely corresponds to a single arrangement of the selected keys, wherein no creativity is exercisable by the at least one builder in arranging the selected keys in the sequence for representing the workflow.

14. The system of claim 11, wherein the limited dictionary comprises less than 1500 keys.

15. The system of claim 11, wherein the communication device is further configured for receiving at least one user content from the at least one end-user device, wherein the at least one user content is subject to copyright protection, wherein the processing device is further configured for integrating the at least one user content with at least one selected key of the selected keys of the workflow, wherein the generating of the application file is further based on the integrating.

16. The system of claim 11, wherein a key of the plurality of keys comprised in the limited dictionary is associated with at least one of at most one predefined keyword and at most one predefined phrase associated with at least one natural language.

17. The system of claim 11, wherein at least one key of the plurality of keys is comprised in a card of at least one card, wherein the at least one key is uniquely specific to the card, wherein the user interface allows the at least one builder to select the at least one card for further generating the workflow, wherein no creativity is exercisable by the at least one builder in selecting the at least one card.

18. The system of claim 17, wherein the user interface allows the at least one builder for arranging the at least one card in a card sequence for further generating the workflow, wherein no creativity is exercisable by the at least one builder in arranging the at least one card.

19. The system of claim 17, wherein a card of the at least one card comprises two or more keys of the plurality of keys in a key sequence, wherein the key sequence of the two or more keys is non-customizable.

20. The system of claim 11, wherein the each key of the plurality of keys is stored in a database, wherein the communication device is further configured for:
receiving at least one new keyword from the builder device;
transmitting the at least one new keyword to an administrator device; and
receiving a feedback from the administrator device, wherein the processing device is further configured for updating the database with the at least one new keyword based on the feedback.

* * * * *